United States Patent

[11] 3,634,639

[72] Inventor Howard R. Jilbert
 Saint Joseph, Mich.
[21] Appl. No. 86,689
[22] Filed Nov. 4, 1970
[45] Patented Jan. 11, 1972
[73] Assignee The Bendix Corporation

[54] BRAKE FAILURE WARNING DEVICE WITH RELATIVELY MOVABLE DETENTED CONTACT BARS ACTUATABLE BY DIFFERENT PRESSURE SOURCES
 12 Claims, 3 Drawing Figs.

[52] U.S. Cl............................................. 200/83 H,
 200/82 D, 200/83 A, 200/166 SD
[51] Int. Cl............................................H01h 35/26,
 H01h 35/34, H01h 35/38
[50] Field of Search........................................ 200/82 D,
 83 R, 83 J, 153 LA, 83 E, 83 A, 166 SD, 83 H

[56] References Cited
 UNITED STATES PATENTS
2,435,143 1/1948 Knauth........................ 200/83 J
2,630,499 3/1953 Weld............................ 200/166 SD
3,011,595 12/1961 Heiss et al..................... 200/83 H
3,228,194 1/1966 Blair............................ 200/82 D UX
3,314,047 4/1967 Zincke et al.................. 200/83 R X
3,382,333 5/1968 Ihnacik, Jr.................... 200/82 D FOREIGN PATENTS
1,120,862 7/1956 France........................ 200/83 H Primary Examiner—Robert K. Schaefer
Assistant Examiner—Robert A. Vanderhye
Attorneys—W. N. Antonis and Plante, Hartz, Smith and Thompson

ABSTRACT: A dual plunger differential pressure indicating device for use in a ground vehicle having separate hydraulic braking systems for the front and rear brakes thereof which will indicate the occurrence of a malfunction in either one of the hydraulic braking systems. The indicating device includes a detent latching device for maintaining the indicating device in an activated position and mechanism for hydraulically resetting the device after correction of the malfunction.

INVENTOR
HOWARD R. JILBERT
BY
Plante, Hartz, Smith & Thompson
ATTORNEYS

3,634,639

BRAKE FAILURE WARNING DEVICE WITH RELATIVELY MOVABLE DETENTED CONTACT BARS ACTUATABLE BY DIFFERENT PRESSURE SOURCES

BACKGROUND OF THE INVENTION

This invention relates to warning devices for indicating loss of pressure in one side of a dual hydraulic vehicular braking system.

In a vehicle having a split system master cylinder, two separate fluid systems connect the master cylinder to a respective set of front and rear brakes for simultaneously activating the same. If the hydraulic system for one set of brakes should fail, the other set of brakes will still operate. While greater pedal effort is required to stop a vehicle by using only one set of brakes, the operator might not realize that one of the hydraulic systems is inoperative. It is, therefore, desirable to provide a warning device in the driver's compartment to indicate a failure in the brake system. However, most existing warning devices operate only while the brakes are applied. Even if one of the systems has failed completely, the vehicle operator is apprised of this fact only during a brake application. Or if the failure indication remains activated upon release of the brakes, it also persists even after pressure to the defective system has been restored until the warning device is reset by a mechanic. It is, therefore, desirable to provide a warning device that, once activated by a failure in the hydraulic system, continuously warns the driver of the existing failure until the device automatically resets when the system is repaired.

SUMMARY OF THE INVENTION

It is an object of this invention to provide a failure warning switch for use in a dual hydraulic vehicular braking system which is capable of indicating any predetermined excessive pressure differential between the two hydraulic brake systems resulting from fluid loss or pressure loss in one of the systems.

It is an important object of this invention to provide a brake failure warning switch which will automatically reset to its normal, nonactuated position upon restoration of normal brake application fluid pressure in all systems without disassembly of the switch itself or bleeding of the brake lines.

It is a further object of this invention to provide a brake failure warning switch which will maintain any failure indication continuously until normal brake application fluid pressure is restored to all systems.

It is a still further object of this invention to provide a brake failure warning switch which minimizes the possibility of cross leakage of hydraulic fluid from one system to the other and from either system into the electrical mechanism.

It is a further object of this invention to provide a relatively inexpensive detachable component brake failure warning switch of the type described, which includes a minimum number of parts and is remotely located from other associated mechanisms for easy replacement, repair, or maintenance.

It is another object of this invention to provide a brake failure warning switch for use in a braking system which has a more simplified construction and a lower actuation displacement loss than previous brake failure indication systems.

DESCRIPTION OF THE PREFERRED EMBODIMENT

Figure 1:
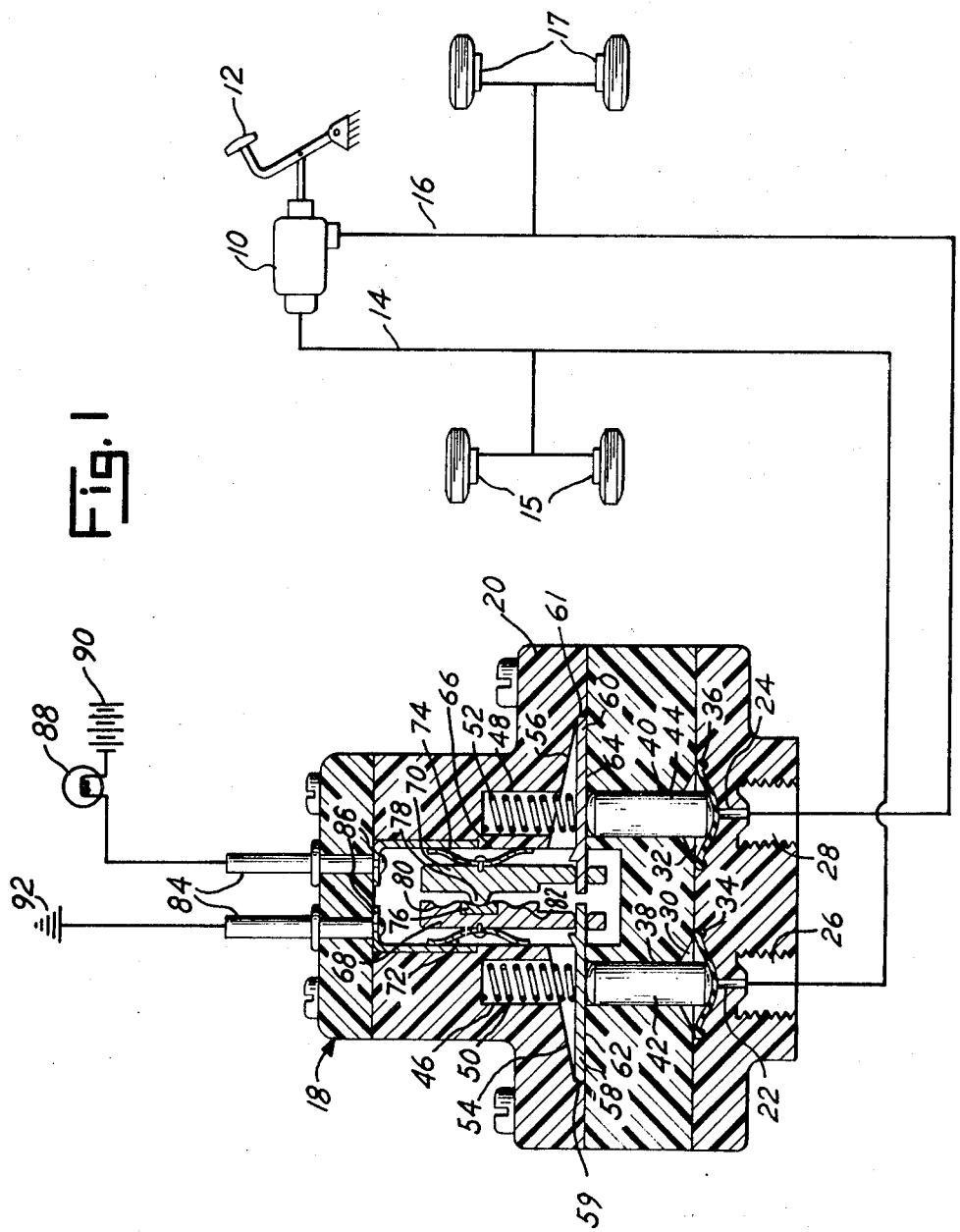
FIG. 1 is a sectional view of my brake failure warning device shown in conjunction with a hydraulic braking system.

Referring now to FIG. 1, fluid pressure is developed in a master cylinder 10 by operation of a brake pedal 12 mounted in the vehicle operator's compartment. Master cylinder 10 is of the split system type and therefore develops pressure in each of a pair of hydraulic systems 14 and 16 to actuate front and rear brakes 15 and 17, respectively.

Each of the hydraulic systems 14 and 16 are connected to separate sensing systems of a differential pressure warning switch 18 which is mounted at any convenient location on the vehicle such as the firewall, where the switch 18, may be grounded.

Switch 18 includes a housing 20 defining passages 22 and 24 therewithin communicating with inlet ports 26 and 28 which are connected to the corresponding hydraulic systems 14 and 16, respectively. Passages 22 and 24 communicate with cavities 30 and 32 which contain diaphragms 34 and 36. Diaphragm cavities 30 and 32 communicate with bores 38 and 40 within which cylindrical plungers 42 and 44 reciprocate in abutting contact with diaphragms 34 and 36. Bores 38 and 40 include at their upper ends, as illustrated by FIG. 1, bore portions 46 and 48 which operatively retain return springs 50 and 52. Located intermediate the bore portions 38 and 46, and 40 and 48, respectively, are angular cavities 54 and 56 which contain actuating levers 58 and 60 pivotally mounted therein at points 59 and 61, respectively. The levers 58 and 60 are urged against shoulders 62 and 64 of the cavities by springs 50 and 52 when there is no pressure in either hydraulic system. Intermediate the bores 46 and 48 is an elongated cavity 66 within which contact bars 68 and 70 are slidably mounted. Contact bars 68 and 70 are interconnected at their lower extremities, as viewed in FIG. 1, with the actuating levers 58 and 60 respectively, and have contact springs 72 and 74, respectively, conductively affixed thereto. Contact bar 70 has a detent 78 thereon. Contact bar 68 includes an insulator 76 and two notches 80 and 82 on the face thereof which mechanically retain detent 78 upon a predetermined amount of relative movement between the bars.

At the top end of the housing 20, as viewed in FIG. 1, are two electrical terminals 84 which are affixed in such a way as to be insulated from each other and have contact strips 86 conductively fastened to the ends of the terminals 84 which are connected in series with the contact springs 72 and 74; with the contact bars 68 and 70; with a failure indicator 88; with the vehicle's battery 90; and with an electrical ground 92.

DESCRIPTION OF THE ALTERNATE EMBODIMENT

Figure 2:
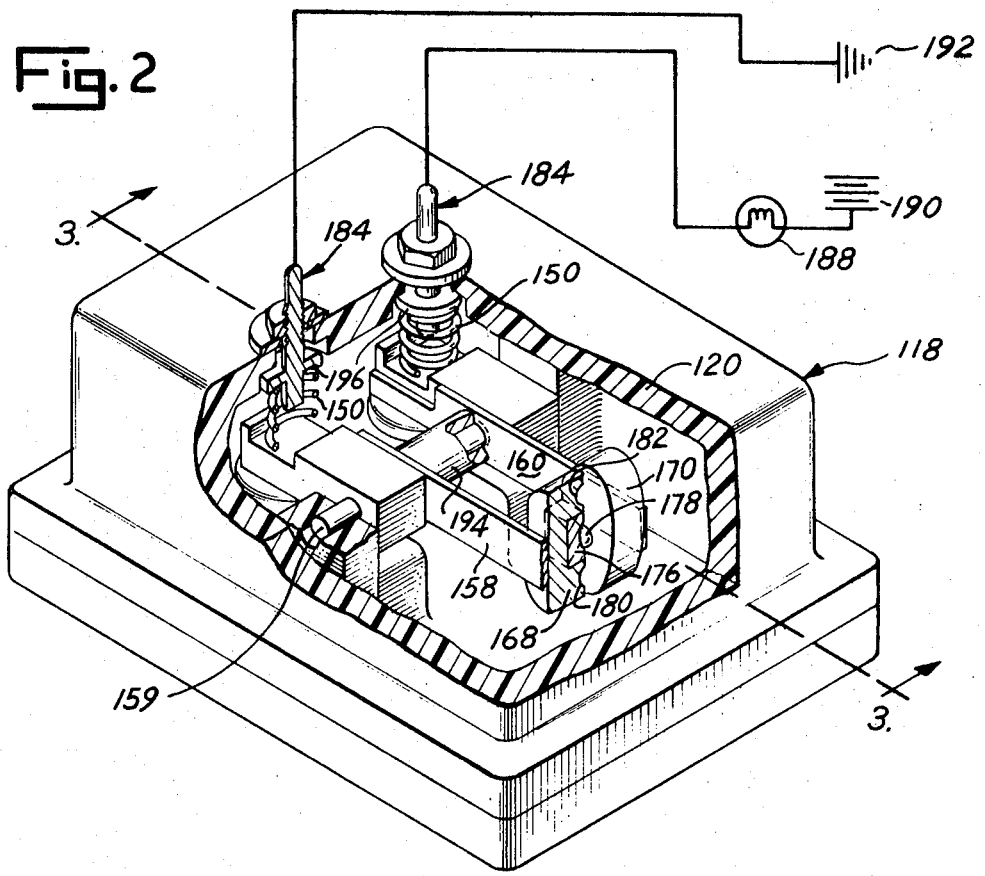
FIG. 2 is a perspective view partially in section of another embodiment of my brake failure warning device.
Figure 3:
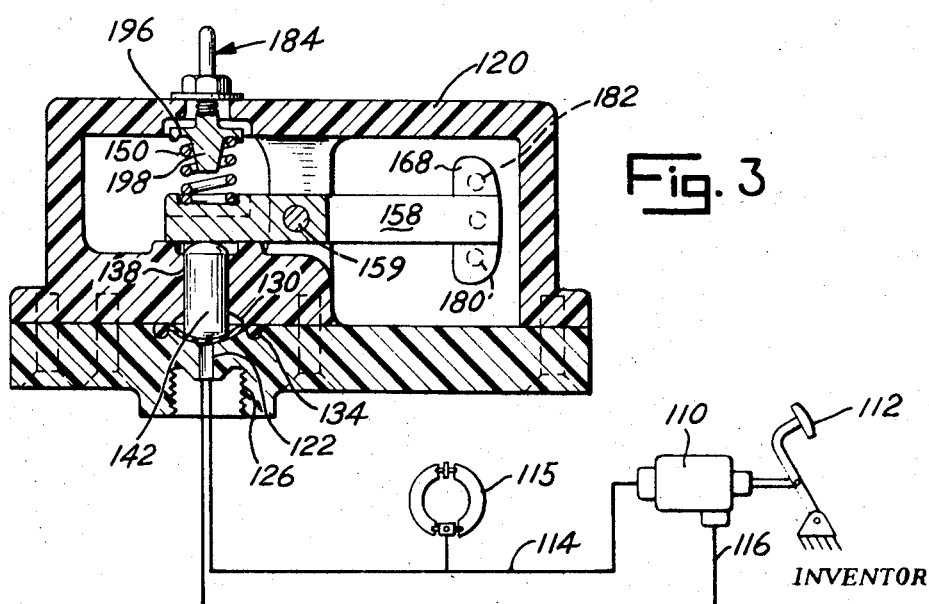
FIG. 3 is a sectional view taken along line 3—3 of FIG. 2.

Referring to FIGS. 2 and 3, it will be noted that like parts are designated by like numerals plus 100.

Switch 118 includes a housing 120 defining passages 122 and 124 (only one of which illustrated) therewithin communicating with inlet port ports 126 and 128 which are connected to the corresponding hydraulic systems 114 and 116, respectively. Passages 122 and 124 communicate with cavities 130 and 132 (only one of which is shown) respectively, within which diaphragms 134 and 136 (only one of which is shown) are operatively carried. Diaphragm cavities 130 and 132 communicate with bores 138 and 140 (only one of which is shown) within which cylindrical plungers 142 and 144 reciprocate in abutting contact with diaphragms 134 and 136, respectively. The other ends of the plungers 142 and 144 (only one of which is shown) are pressed against actuating levers 158 and 160 which are pivotally connected to the housing 120 by insulated pivot pin 159 and spacer 194 which maintain electrical isolation between the two actuating levers 158 and 160. At the distal portions of actuating levers 158 and 160 opposite the ends against which the plungers 142 and 144 press, contact bars 168 and 170 are affixed. Contact bar 170 has a detent 178 located thereon. Contact bar 168 includes an insulator 176 and two notches 180 and 182 serving to mechanically retain detent 178 upon a predetermined amount of relative movement between the bars 168 and 170.

Permanently mounted in the housing 120, are electrical terminals 184 which are electrically insulated from each other and have a recessed annular channel 196 and a center pilot post 198 included on their interior portion, as viewed in FIG. 2, for the purpose of retaining electrically conductive return springs 150 which are connected in series with the terminals 184, with the actuating levers 158 and 160, with the contact bars 168 and 170, with a failure indicator 188, with the vehicle's battery 190, and with a suitable electrical ground 192.

MODE OF OPERATION

Assuming no malfunction in the brake hydraulic system the contact bars 68 and 70 are juxtaposed in such a way that detent 78 presses against insulator 76 and insulates the switch 18, from the ground 92 thus causing the electrical circuit through contact spring 72, contact bar 68, contact bar 70, contact spring 74, contact strip 88, one of the terminals 84, the indicator 88, and the vehicle's battery 90, to remain open. In this nonactuated operational mode, the indicator 88 will not function. However, if a malfunction in either of the hydraulic systems 14 and 16 occurs, causing a loss of pressure at one of the inlet ports 26 or 28, pressure in the other port causes the associated diaphragm 34 and 36 to move upward against the plunger 42 or 44. This in turn forces the actuating lever 58 or 60 to swing about pivot point 59 or 61, thus shifting either contact bar 68 or 70 with respect to the other. Such relative movement causes detent 78 to be lodged in notch 80 or 82 and the switch 18 is in an actuated operational mode position. An electrical circuit is completed through the contact bars 68 and 70, contact springs 72 and 74 contact strips 86, and terminals 84 to the ground 92 from the batter 90, thus causing indicator 88 to function.

Upon release of the brakes, stored energy of the return spring 50 and 52 acts to return the contact bars 68 and 70 and associated linkage, i.e., actuating levers 58 and 60, plungers 42 and 44 and diaphragms 34 and 36, to their base positions. The force of this thrust is not great enough, however, to cause the detent 78 to be dislodged from notch 80 or 82 so that the switch is mechanically latched in the closed position by the force of contact springs 72 and 74 and the failure indicator 88 remains energized.

When fluid pressure is restored in the malfunctioning system, both diaphragms 34 and 36, plungers 42 and 44, and actuating levers 58 and 60, move upwardly in unison until the uppermost contact bar 68 and 70 reaches the limit of its travel. Either contact bar 68 or 70 reaches the limit of its travel. Either contact bar 68 or 70 could be uppermost depending upon which hydraulic system pressure failure caused the failure mode positioning of the switch, i.e., whether detent 78 is lodged in notch 80 or 82. As hydraulic pressure continues to rise the other contact bar 68 or 70 is pushed upward in cavity 66, as viewed in FIG. 1, and detent 78 is disengaged from notch 80 or 82 and urged onto insulator 76, thus breaking the electrical circuit and deactivating the indicator 88 while automatically resetting the warning switch 18.

In the embodiment of FIGS. 2 and 3, movement of diaphragm 134 or 136 with respect to the other causes the associated plunger 142 or 144 and actuating lever 158 or 168 to move causing detent 178 to move from insulator 176 into notch 180 or 182, depending upon which hydraulic system pressure has failed to complete an electrical circuit from the electrical ground 192 through the terminals 184, the return springs 150, actuating levers 158 and 160, and contact bars 168 and 170 to the vehicle battery 190 and thereby actuate indicator 188. The spring action of actuating levers 158 and 160 maintain engagement of the detent 178 in the notch 180 or 182 until normal system fluid pressure is restored, thus mechanically latching the switch in the actuated or failure operational mode position. Restoration of fluid pressure to both inlet ports acts to disengage detent 178 from notch 180 or 182 to reposition the detent 178 or insulator 176 by moving the diaphragm 132 or 134, depending upon which hydraulic system failure caused the failure mode positioning of the switch. At the same time one of the plungers 142 or 144 will move upward, as viewed in FIG. 2, with respect to the other plunger 142 or 144, thus causing contact bar 168 or 170 to move downward, as viewed in FIG. 2, with respect to the other contact bar 168 or 170 through the motion of actuating lever 158 or 160 about pivot pin 159. This occurs as the result of urging by the plunger 142 or 144 against the actuating lever 158 or 160, thus automatically breaking the electrical circuit and deactivating the indicator 188 while resetting the warning switch 118 in its base position.

I claim:

1. In a fluid system having first and second sources of fluid pressure, a differential pressure indicating device comprising:
   a housing having first and second pressure-responsive means located therein, one of which is operatively connected to and moveably responsive to said first source of fluid pressure and the other of which is operatively connected to and movably responsive to said second source of fluid pressure;
   electrical switch means located in said housing and having a pair of contact bars, one of which is operatively connected to and movable with one of said pressure-responsive means and the other of which is operatively connected to and movable with the other of said pressure-responsive means; and
   detent means formed on said contact bars for activating a warning signal upon relative movement between said bars;
   said detent means moving from a nonlatching to a latching position upon relative movement of said bars to provide a continuous warning signal until predetermined pressures are subsequently applied to said first and second pressure-responsive means.

2. A differential pressure indicating device, as defined in claim 1, wherein said housing includes first and second ports communicating respectively with said first and second sources of fluid pressure, first and second bores connected respectively to said first and second ports, and a cavity located intermediate said bores;
   said first and second pressure-responsive means includes first and second plungers respectively slidable in said first and second bores, one of said plungers being operatively connected to one of said contact bars to cause movement thereof and the other of said plungers being operatively connected to the other of said contact bars to cause movement thereof; and
   said contact bars are located in said cavity.

3. A differential pressure indicating device, as defined in claim 2, which includes lever means located between said plungers and said contact bars for transmitting motion from said plungers to said contact bars.

4. A differential pressure indicating device, as defined in claim 3, which includes first resilient means for opposing movement of said plungers.

5. A differential pressure indicating device, as defined in claim 4, wherein said first resilient means are located in said bores.

6. A differential pressure indicating device, as defined in claim 4, which includes electrical circuit means for activating said warning signal, wherein said first resilient means is located in said housing and is a component part of said electrical circuit means.

7. A differential pressure indicating device, as defined in claim 4, which includes second resilient means located in said cavity for urging said contact bars toward each other.

8. A differential pressure indicating device, as defined in claim 7, which includes electrical circuit means for activating said warning signal wherein said second resilient means is a component part of said electrical circuit.

9. A differential pressure indicating device, as defined in claim 8, which includes diaphragm means in contact with the ends of said first and second plungers and located between said first and second ports and said first and second plungers, respectively, to isolate said first and second sources of fluid pressure from said electrical switch means and prevent cross leakage between said pressure sources.

10. A differential pressure indicating device, as defined in claim 9, wherein said lever means includes a first lever located between said first plunger and one of said contact bars and a second lever located between said second plunger and the other of said contact bars, said first and second levers each having one end thereof pivotally connected to said housing, the other end thereof operatively connected to its associated contact bar, and an intermediate portion thereof operatively connected to its associated plunger.

11. A differential pressure indicating device, as defined in claim 9, wherein said lever means include a first lever located between said first plunger and one of said contact bars and a second lever located between said second plunger and the other of said contact bars, said first and second levers each having one end thereof operatively connected to its associated plunger, the other end thereof operatively connected to its associated contact bar, and an intermediate portion thereof pivotally connected to said housing.

12. A differential pressure warning switch, as defined in claim 11, wherein said lever means is a component part of said electrical circuit means.

* * * * *

PO-1050
(5/69)

UNITED STATES PATENT OFFICE
CERTIFICATE OF CORRECTION

Patent No. 3,634,639          Dated January 11, 1972

Inventor(s) Howard R. Jilbert

It is certified that error appears in the above-identified patent and that said Letters Patent are hereby corrected as shown below:

Column 3, Lines 38 and 39: delete "Either contact bar 68 or 70 reaches the limit of its travel."

Signed and sealed this 19th day of December 1972.

(SEAL)
Attest:

EDWARD M. FLETCHER, JR.
Attesting Officer

ROBERT GOTTSCHALK
Commissioner of Patents